Patented Jan. 27, 1948

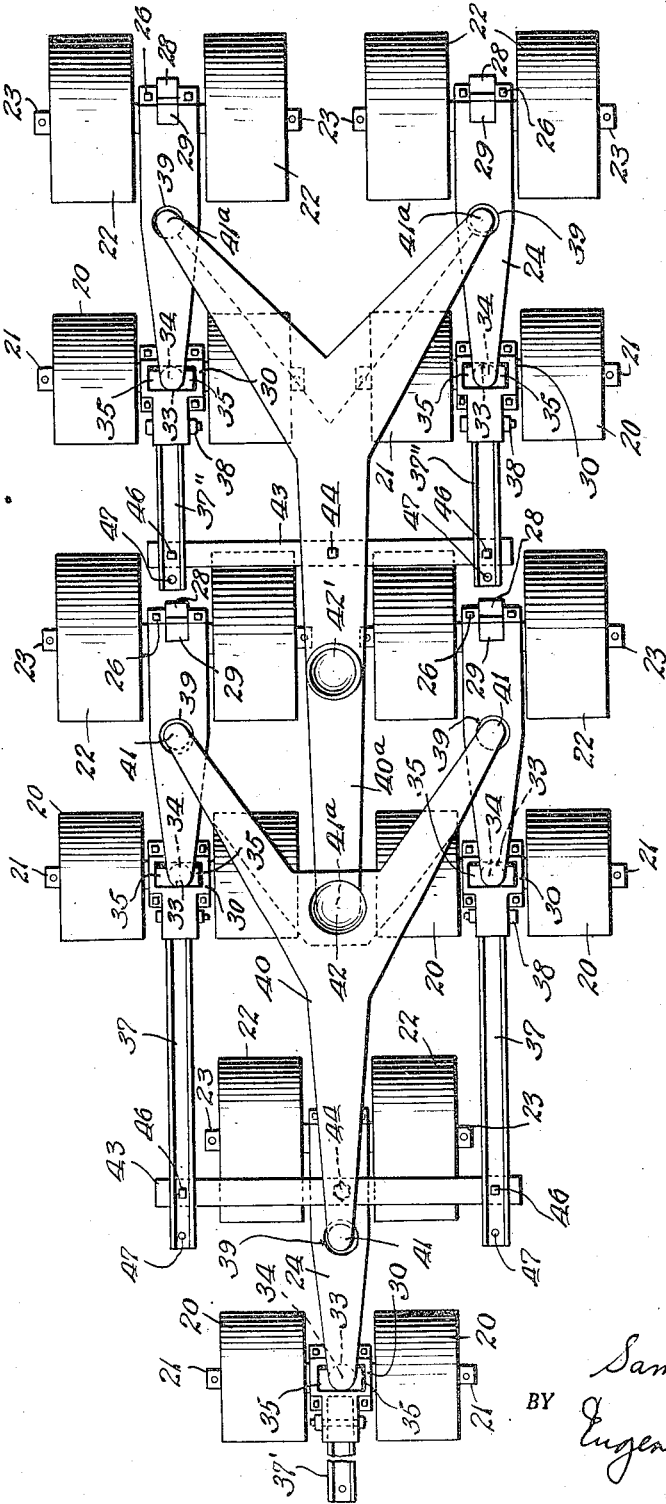

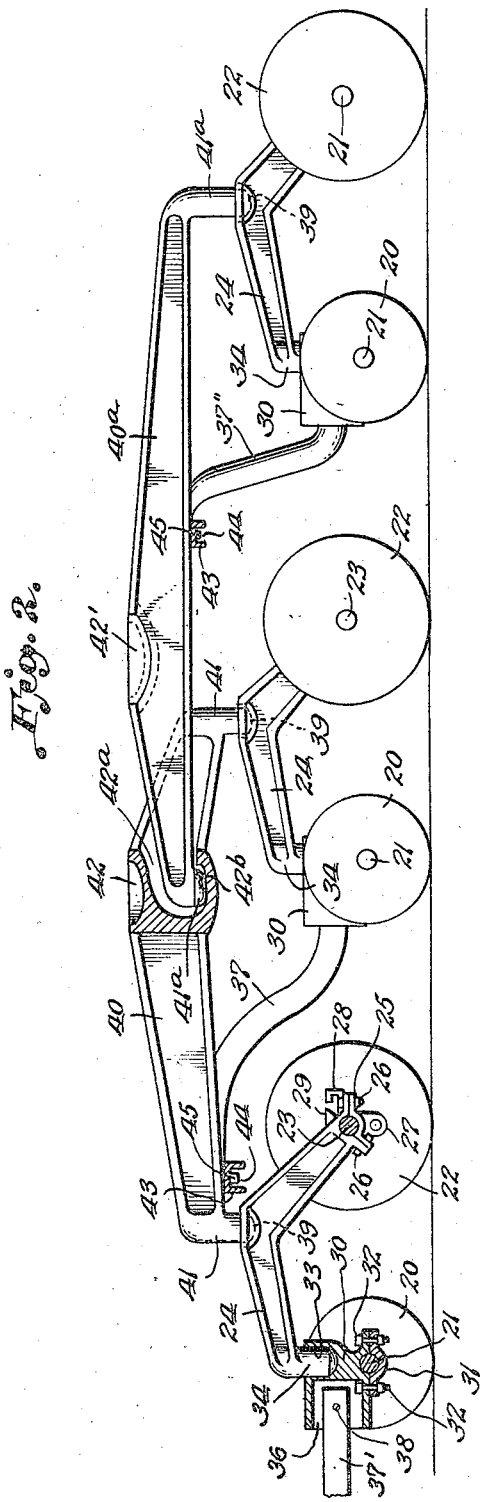

2,434,999

UNITED STATES PATENT OFFICE 2,434,999

HOUSE-MOVING TRUCK

Samuel P. Griffin, Indianapolis, Ind.; Richard A. Griffin, administrator of said Samuel P. Griffin, deceased Application July 19, 1945, Serial No. 605,923

6 Claims. (Cl. 280—81)

My invention relates to trucks such as are used for moving houses, buildings and other large objects and it aims to generally improve upon the house-moving truck disclosed in my Patent No. 1,641,848, dated September 6, 1927; and particularly to provide means whereby supplementary truck sections may be readily attached for extending the truck assembly in the direction of its length.

More specifically, it is a primary object of the instant invention to provide a novel and improved primary load sustaining member which is preferably, but not necessarily, of the three-point supported type and incorporates novel means whereby a second primary load-sustaining member may be coupled thereto to furnish what may be termed an extension of the first member.

Various other objects and advantages of the invention will be understood and appreciated by those skilled in the art from a reading of the following descriptive matter in conjunction with the accompanying drawings, illustrating my inventive concept in its now preferred form. It is to be understood, however, that the disclosures herein are to be taken as illustrative rather than limitative, it being obvious that various changes and modifications may be made therein within the spirit and scope of the subject matter claimed hereinafter.

In the drawings, wherein the same reference characters have been used to designate the same parts throughout the several views, Fig. 1 is a plan view of a group or set of house moving trucks, incorporating two primary load sustaining members, the one coupled to and providing an extension of the other and each having a three-point bearing or support on different ones of subjacent trucks; and Fig. 2 is a side elevational view of the assembly of Fig. 1 but showing the foremost truck in longitudinal section and likewise a portion of the foremost one of the load supporting members partly in section to illustrate the means of connecting the second primary load sustaining member thereto.

As shown in the drawings, there is employed a set or group of trucks including one front truck and two trucks in the rear thereof arranged side by side but each one offset laterally with respect to the front truck. Additionally, and in which respect the instant invention differs from the disclosure in my prior patent, I provide behind each of the aforementioned rear trucks an additional truck.

The trucks aforementioned are of the same construction so that they may be used interchangeably as is also true of the trucks illustrated in my prior patent.

Each truck has two pairs of wheels, including the front wheels 20 mounted on axles 21, and rear wheels 22, preferably of larger diameter, mounted on the axle 23. Although I have illustrated the wheels 20, 22 as being of the broad metal tread type, yet it is obvious that they may be made of other materials, and I also propose in many instances to use pneumatic tired wheels, such as are employed on cargo trucks.

Each truck has a beam 24 disposed between the wheels of the two pairs, and the beam 24 has a split clamp at its rear end, including a removable cap member 25 secured in place by bolts 26 or other securing elements, for tightly embracing the axle 23 between the wheels 22. The member 25 has a depending apertured lug 27 for the connection of a chain, cable, or the like, for pulling a truck from place to place or for connecting the trucks in a train so as to trail one in rear of the other. The rear end portion of the beam 24 is provided above the member 25 with a hook 28 for the engagement of a draft tongue, pole, rod or the like, and in front of the hook 28 is an inclined abutment 29 which will prevent the tongue or pole jumping upwardly when moved out of the hook 28, thereby preventing accidental separation of the parts.

A swivel connection is used between the front axle 21 and front end of the beam 24 of each truck. Thus, a casting or member 30 is provided with a split clamp, including a removable cap member 31 fastened in place by the bolts 32 or other securing elements, to tightly embrace the axle 21 between the wheels 20. The member 30 has an upper recess 33 receiving a depending pivot stud 34 with which the forward end of the beam 24 is formed, and the bottom of the recess 33 and lower end of the stud 34 are rounded. The front and rear walls of the recess 33 bear against the cylindrical surface of the stud 34, but the side walls of the recess 33 diverge upwardly, as at 35, thereby permitting the axle 24 and member 30 to oscillate transversely relatively to one another, such as when the wheels 20 and 22 pass over uneven surfaces. The member 30 has a forwardly opening recess 36, and said recesses of the front, intermediate and rear trucks receive the rear ends of the respective draft bars 37, 37' and 37'' which are pivoted within said recesses on transverse bolts 38 extending through the members 30 within said recesses.

The beam 24 of each truck is arched to permit the front wheels 20 to move under said beam when turning the axle 21 and member 30 about the vertical axis of the pivot stud 34. The beam 24 is provided with an upper recess 39 intermediate the ends thereof for the pivotal engagement of the downturned bearing ends 41, or 41a of the connected Y-shaped load supporting members 40, or 40a, respectively.

The Y-shaped load-supporting members 40, 40a are detachably connected as will be presently explained and their form and especially the use of the second member 40a constitute an outstanding improvement over the disclosure of my said prior patent.

As illustrated in the drawings 2, the load supporting member 40 (which except as hereinafter noted, is similar to the corresponding member of my aforementioned patent), is of metal and is Y-shaped, with its limbs preferably of I section. The member 40 is disposed with its fork facing rearwardly, and said member is formed at its extremities with depending pivot studs 41, whose lower ends are rounded so as to fit in the concaved bottoms of the recesses 39 of the truck beams 24, thus permitting a universal movement of the beams relatively to the member 40. The cylindrical walls of the recesses 39 are also spaced slightly from the cylindrical surfaces of the studs 41 so as to permit slight movements of the studs 41 in the recesses 39. It is thus possible for the front and intermediate trucks to oscillate in various directions relatively to the load sustaining member 40, and said member has a three-point bearing so as to distribute the load from said member proportionately between said front and intermediate trucks. The member 40 is provided at an intermediate point with a recess 42 to receive a member, such as the timber support 48 of my prior Patent No. 1,641,848, earlier mentioned herein, on which the building or load rests in order that the load will be transmitted to the front and intermediate trucks.

Reference will now be had to the novel second, or extension Y-shaped load-supporting member 40a and the novel coupling-providing feature of the first load supporting member 40.

As shown, the second, or extension, load-sustaining member 40a has its forward pivot end 41a received in the recess 42a of the first load sustaining member 40. This recess 42a is located at the crotch portion of the member 40 and immediately beneath the upper surface recess 42 thereof. The bottom of recess 42a provides a bearing 42b for the rounded pivot knob 41a of member 40a and said bearing 42b is diametrically larger than the pivot end 41a of member 40a so as to admit of rocking movement.

As will be apparent, the location of bearing 41a, 42b effects even distribution of the forward end load of the second Y-shaped member 40a to the first member 40 and to the trucks which support it. And, of course, the member 40's own load carried by the superjacent bearing 42 will also be so distributed.

In order to cause the intermediate trucks and the rear trucks to properly trail the front and intermediate trucks, respectively, a transverse bar 43 extends under each of the members 40, 40a near the front ends thereof, and is pivoted on a depending stud 44 with which the members 40, 40a are provided. A suitable retaining element 45 engages said stud for holding the bar 43 thereon. The forward terminals of the draft bars 37, 37'' of the intermediate and rear trucks, respectively, are pivoted to the terminals of the aforementioned evener bars 43 of the respective Y-shaped load sustaining members 40, 40a by means of bolts 46 or other pivot elements. Also, as shown, the forward portions of the bars 37, 37'' are off-set upwardly and extend over the associated bar 43 thereby permitting the front and intermediate trucks to be turned without interference. The draft bars 37, 37'' are thus trailed from the evener bars 43 to guide the intermediate and rear trucks, and the bars 43 and 37, 37'' are free to oscillate, as in my prior patent, so that the trucks may pass over uneven surfaces without any of the parts binding.

The draft bars 37, 37'' have holes 47 in their forward terminals for the connection of chains, cables or other elements used for pulling the trucks, or for connecting the trucks one behind the other, when used in that arrangement.

Having thus described my invention, what I claim as new is:

1. A house moving apparatus comprising a front truck, two rear trucks disposed side by side, two trucks intermediate the front and rear trucks and also disposed side by side, the rear trucks being adapted to trail the intermediate trucks, each truck having front and rear wheels and a longitudinal beam connecting them, a load sustaining member having a front terminal and two laterally spaced rear terminals, the terminals of said load sustaining member and the three beams of the front and intermediate trucks having contacting portions fitting together for turning in oscillatory motions and providing a three-point bearing for said load sustaining member, a second load sustaining member having a front terminal and two laterally spaced rear terminals, the first load sustaining member having a bearing inwardly of its rear terminals, the front terminal of said second load sustaining member being received in the bearing of the first load sustaining member, and bearing connections between the beams of the rear trucks and the rear terminals of the second load sustaining member.

2. In a house moving apparatus or the like, forward and rear load sustaining members, each of said load sustaining members having a front terminal and at least the forward member having two laterally spaced rear terminals, a bearing connection between the front terminal of the rear load sustaining member and the forward load sustaining member at a point intermediate the rear terminals of said forward load-sustaining member and between the upper and lower surfaces of the latter, and separate truck means supporting the rear terminals of said load sustaining members and the front terminal of the forward sustaining member.

3. In a house moving apparatus or the like, forward and rear load sustaining members, each of said load sustaining members having a front terminal and at least the forward member having two laterally spaced rear terminals, a bearing connection between the front terminal of the rear load sustaining member and the forward load sustaining member at a point intermediate the rear terminals of said forward load-sustaining member and between the upper and lower surfaces of the latter, separate truck means supporting the rear terminals of said load sustaining members and the front terminal of the forward load sustaining member, the upper surfaces of said load sustaining members each having at least one load supporting bearing located for efficient load distribution to its supporting means, and the load supporting bearing of the forward member being in substantial vertical alignment with said member connecting bearing.

4. The combination set forth in claim 2, and said bearing connection comprising a rearwardly opening recess portion in the forward member and having a downwardly offset bearing, and a downwardly directed bearing stud adjacent the front terminal of the rear member, the bearing recess in the forward member and its bearing both being oversize with respect to the front terminal bearing stud of the rear member, whereby to permit relative universal movement.

5. The combination set forth in claim 3, and said bearing connection comprising a rearwardly opening recess portion in the forward member and having a downwardly offset bearing, and a downwardly directed bearing stud adjacent the front terminal of the rear member, the bearing recess in the forward member and its bearing both being oversize with respect to the front terminal bearing stud of the rear member, whereby to permit relative universal movement.

6. In a house moving apparatus or the like, forward and rear load sustaining members, each of said load sustaining members having a front terminal and at least the forward member having two laterally spaced rear terminals, a bearing connection between the front terminal of the rear load sustaining member and the forward load sustaining member at a point intermediate the rear terminals of said forward load sustaining member and below the plane of the top surface of the latter, the top surface of said forward load sustaining member providing a load rest, and separate truck means supporting the rear terminals of said load sustaining members and the front terminal of the forward sustaining member.

SAMUEL P. GRIFFIN.

REFERENCES CITED

The following references are of record in the file of this patent:

UNITED STATES PATENTS

| Number | Name | Date |
| --- | --- | --- |
| 1,641,848 | Griffin | Sept. 6, 1927 |

FOREIGN PATENTS

| Number | Country | Date |
| --- | --- | --- |
| 6,014 | Australia | June 17, 1927 |